(12) United States Patent
Foley et al.

(10) Patent No.: US 8,557,452 B2
(45) Date of Patent: Oct. 15, 2013

(54) HYDRODESULFURIZER RECYCLE APPLIED UPSTREAM OF PROCESSOR FEEDSTOCK PRESSURIZATION

(75) Inventors: Peter F. Foley, Manchester, CT (US); Joshua D. Isom, South Windsor, CT (US); John L. Preston, Hebron, CT (US)

(73) Assignee: ClearEdge Power Corporation, South Windsor, CT (US)

( * ) Notice: Subject to any disclaimer, the term of this patent is extended or adjusted under 35 U.S.C. 154(b) by 468 days.

(21) Appl. No.: 12/736,137

(22) PCT Filed: May 22, 2008

(86) PCT No.: PCT/US2008/006567
§ 371 (c)(1),
(2), (4) Date: Sep. 14, 2010

(87) PCT Pub. No.: WO2009/142611
PCT Pub. Date: Nov. 26, 2009

(65) Prior Publication Data
US 2011/0003214 A1    Jan. 6, 2011

(51) Int. Cl.
*H01M 8/06*  (2006.01)
*H01M 8/04*  (2006.01)
*H01M 8/22*  (2006.01)
*B01J 19/00*  (2006.01)
*B01J 8/00*  (2006.01)
*C01B 3/24*  (2006.01)

(52) U.S. Cl.
USPC ........... 429/410; 429/444; 429/505; 422/187; 422/629; 48/127.1; 48/127.9

(58) Field of Classification Search
USPC .......... 429/410, 413, 415, 444, 505; 422/187, 422/629, 198, 211; 48/127.1, 127.9
See application file for complete search history.

(56) References Cited

U.S. PATENT DOCUMENTS

| | | | | |
|---|---|---|---|---|
| 3,909,299 A | * | 9/1975 | Corrigan | 422/629 |
| 4,098,960 A | * | 7/1978 | Gagnon | 429/410 |
| 5,094,926 A | * | 3/1992 | Kobayashi et al. | 429/410 |
| 6,316,134 B1 | * | 11/2001 | Cownden et al. | 429/410 |
| 6,969,562 B2 | * | 11/2005 | Su et al. | 429/410 |
| 2003/0148167 A1 | * | 8/2003 | Sugawara et al. | 429/34 |
| 2005/0181247 A1 | * | 8/2005 | Foger et al. | 429/17 |

* cited by examiner

*Primary Examiner* — Kenneth Douyette
(74) *Attorney, Agent, or Firm* — M. P. Williams

(57) ABSTRACT

Fuel processing by a reformer (42) and a shift reactor (44) converts hydrocarbon feedstock (12) and steam (36) to hydrogen-rich reformate (11), such as for use in a fuel cell power plant (47). Some of the reformate is recycled through a restriction (18) to the inlet (15) of a feedstock pump (14), thereby increasing its pressure sufficiently to cause recycle flow through a hydrodesulfurizer (21) and the secondary inlet (26) of an ejector (28) driven by the steam (36). Recycle pressure (48) is maintained by steam pressure through a valve (34) regulated by a controller (17).

6 Claims, 1 Drawing Sheet

US 8,557,452 B2

HYDRODESULFURIZER RECYCLE APPLIED UPSTREAM OF PROCESSOR FEEDSTOCK PRESSURIZATION

TECHNICAL FIELD

A fuel processor extracts hydrogen-rich reformate from low pressure hydrocarbon feedstock, such as anaerobic digester gas (ADG). Some of the generated hydrogen-rich reformate is recycled to the feedstock inlet of a hydrodesulfurizer using pressure created by a steam ejector. To reduce the pressure rise required in the ejector, the recycle reformate is injected upstream of the pump which pressurizes the feedstock for application to the hydrodesulfurizer.

BACKGROUND ART

Hydrogen-rich reformate gas used as a fuel for fuel cell power plants must contain very little carbon monoxide to avoid degrading the catalysts. The generation of hydrogen-rich reformate gas from a variety of hydrocarbon fuels is well known. In a typical catalytic steam fuel processor, sulfur is first removed from the fuel and thereafter the sulfur free fuel is mixed with steam for application to a steam reformer where a significant fraction of the hydrogen is extracted from the fuel, following which a significant quantity of carbon monoxide is converted into innocuous carbon dioxide, while additional hydrogen is produced, in one or more stages of water/gas shift reactors. To provide hydrogen for the hydrodesulfurization process, some of the reformate is recycled to the inlet to the hydrodesulfurizer.

FIG. 1 illustrates the major components of a known system for processing fuel that extracts hydrogen-rich reformate gas in a conduit 11 from anaerobic digester gas. The anaerobic feedstock is provided by an anaerobic digester 12 through a conduit 13 to an inlet 15 of a feedstock pressurizing pump 14, in which the anaerobic feedstock is pressurized. The feedstock flow is regulated by a valve 16 in response to a controller 17.

A portion of the reformate gas in the conduit 11 is passed through a flow restriction 18 and a conduit 19 to be mixed with the feedstock at the inlet 20 of a hydrodesulfurizer (HDS) 21. A conduit 24 connects the exhaust 25 of the HDS to the secondary inlet 26 of a steam ejector 28. The primary inlet 29 receives steam in a conduit 32, the flow of which is regulated by a valve 34 that receives steam from a steam source 36. The flow of steam through the ejector 28 causes a vacuum at the secondary inlet 26 which draws the desulfurized feedstock through the conduit 24 and mixes the desulfurized feedstock with the steam. The mixture then passes through ejector outlet 37 of the ejector 28, as ejector outflow in a conduit 38, to a fuel processing system (FPS) 40.

The mixed steam and desulfurized feedstock are then converted to hydrogen, carbon monoxide, carbon dioxide and traces of other gases in a steam reformer 42, the output of which in a conduit 43 is fed to one or more shift reactors 44. The shift reactors 44 convert additional steam and harmful carbon monoxide into additional hydrogen and innocuous carbon dioxide, to provide hydrogen-rich reformate gas. The fuel processor system (FPS) 40 is conventional and includes the reformer 42 and the shift reactors 44, along with a variety of heat exchangers and other ancillary equipment not shown for clarity.

In order to have hydrogen-rich reformate recycle gas from the conduit 11 reach the HDS inlet 20, the pressure rise $P_{ejt}$ between the secondary inlet 26 and the outlet 40 of the ejector 28 must be greater than the sum of the pressure drop $P_{fps}$ across the fuel processing system and the pressure drop $P_{hds}$ through the hydrodesulfurizer 21.

SUMMARY

Economic advantage can be realized by utilizing fuels created from waste, such as anaerobic digester gas (ADG), which provides methane from anaerobic decomposition of organic material. However, this type of fuel is available only at low pressure, and is typically pumped to higher, more useful pressures before being converted into reformate.

Natural gas fuel cell power plants operating on alternative fuels, such as bio-fuels, may become limited in maximum power due to a limitation in the steam ejector 28 which pumps the fuel into the power plant. Bio-fuels from landfills and anaerobic digesters at wastewater treatment plants typically contain 35% to 45% carbon dioxide (CO2) in addition to the methane present in the fuel. As a result, the ejector inside the fuel processor must pump approximately 1.5 volumes of denser bio-fuel gas to provide the same amount of methane that would be present in a volume of pipeline natural gas. This increased ejector pumping requirement can limit the maximum output of the fuel cell power plant when the ejector fuel inlet pressure is no longer low enough to draw reformate recycle gas into the hydrodesulfurizer. This can be mitigated by re-routing the reformate recycle stream to the inlet of an external pump, which can then draw the reformate into the bio-fuel gas and function as a pressure booster to assist the ejector in pumping sufficient bio-fuel into the power plant to achieve rated power output.

For efficient use of fuel, weight and space, processes such as conversion of hydrogen and oxygen to electricity in fuel cell power plant 47 are most effective if the amount of parasitic power is minimized. Thus, additional pumps, such as for recycle, should be avoided. In this case, a recycle pump would not be practical since the requirements for a low flow and significant head rise are difficult at best. Ejectors are used to generate the pressure rise necessary to drive the circulation of the recycle hydrogen. However, the range of effectiveness of ejectors is limited. As a result, at "end of life" of an ADG-fueled fuel cell power plant, power output may be reduced to 75 percent of rated power, largely due to the hydrogen recycle pressure problem.

The pressure rise required of an ejector, to provide recycle reformate to a hydrocarbon feedstock hydrodesulfurizer, is reduced by feeding the recycle reformate upstream of the feedstock pump.

Variations will be apparent in the light of the following detailed description of an exemplary embodiment, as illustrated in the accompanying drawings.

MODE(S) OF IMPLEMENTATION

Figure 1:
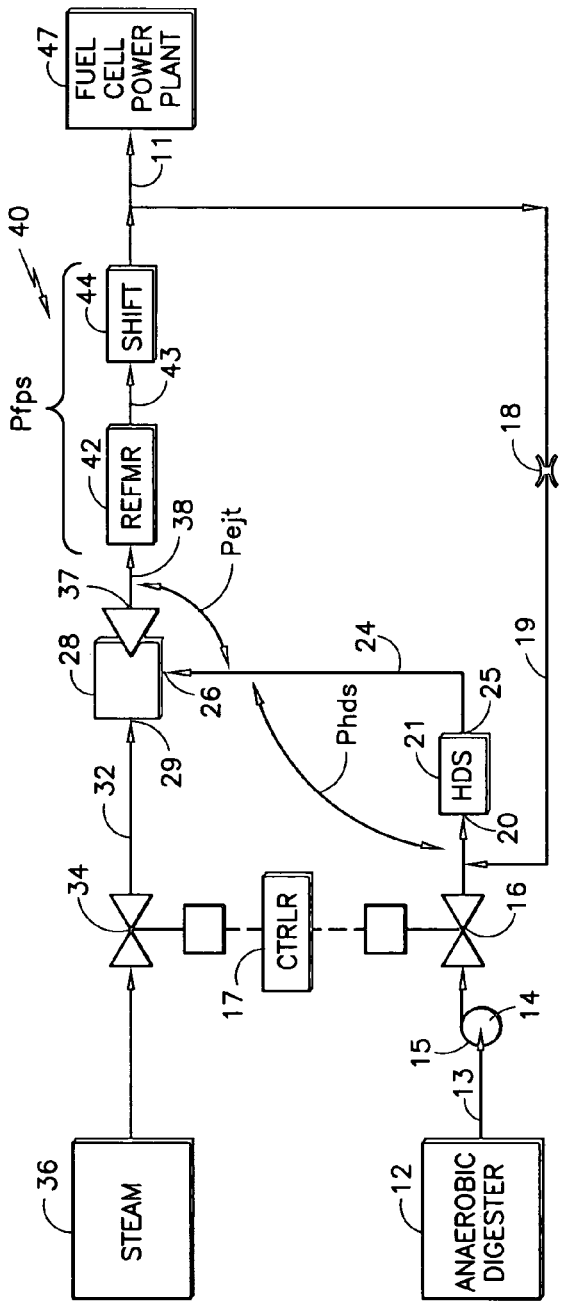
FIG. 1 is a simplified schematic block diagram of a fuel processing system for extracting hydrogen-rich reformate gas from anaerobic digester gas feedstock, known to the prior art.
Figure 2:
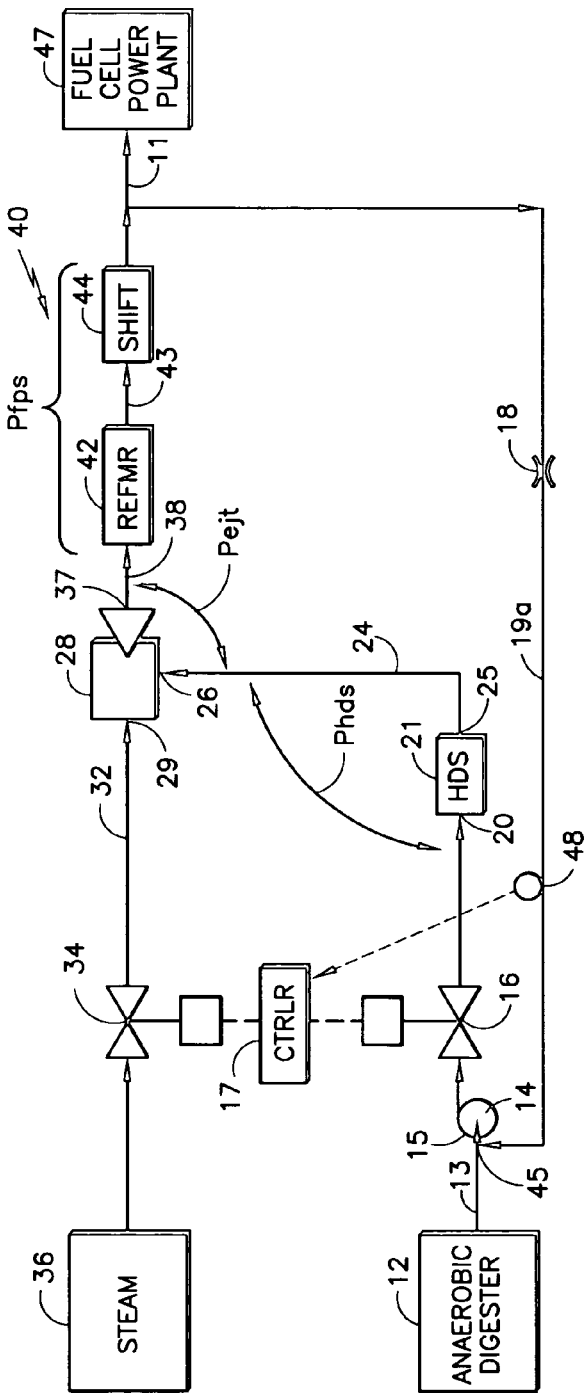
FIG. 2 is a simplified schematic block diagram of a fuel processing system for extracting hydrogen-rich reformate gas from anaerobic digester gas feedstock having the pressure of hydrogen recycle gas for a hydrodesulfurizer increased by the feedstock pump.

Adequate hydrogen recycle, using a conventional ejector, is assured by causing the hydrogen-rich reformate recycle gas in the conduit 11 to be applied through the flow restriction 18 and a conduit 19a to a gas flow connection 45, at the inlet 15 to the feedstock pump 14. The hydrogen-rich reformate recycle gas thus has the benefit of the pressure rise of pump 14, thereby reducing the required pressure rise $P_{ejt}$ across the secondary inlet of the ejector 28.

The additional load on the pump 14 is small, and requires minimal additional cost, weight or volume in the system. The pressure of the recycle hydrogen is maintained above the required inlet pressure of the pump 14 by adjusting the steam pressure at the primary inlet 29 of the ejector 38. The controller 17 maintains the recycle hydrogen pressure by adjusting the valve 34 in response to pressure indications from a pressure sensor 48.

While described in a system utilizing anaerobic digester gas, the disclosed methodology for increasing pressure of hydrogen recycle gas may be used with other fuels.

The invention claimed is:

1. Apparatus comprising:
   a fuel processor (40) including at least a steam reformer (42) and a shift reactor (44) configured to provide hydrogen-rich reformate gas in an output conduit (11);
   a hydrodesulfurizer (21);
   an ejector (28) configured to receive steam (36) at a primary inlet (29), the ejector configured to provide ejector outflow (38) to said fuel processor, a secondary inlet (26) of said ejector being configured to receive desulfurized fuel from said hydrodesulfurizer;
   a feedstock pressurizing pump (14) configured to receive hydrocarbon feedstock (12) at a pump inlet (15) and provide pressurized hydrocarbon feedstock to said hydrodesulfurizer;
   characterized by:
   a gas flow connection (18, 19a, 45) between the output conduit (11) of said fuel processor and the inlet (15) of said feedstock pressurizing pump, configured to convey a portion of hydrogen-rich reformate gas produced by said fuel processor to the inlet of said feedstock pressurizing pump.

2. Apparatus according to claim 1 further characterized in that:
   said source of hydrocarbon feedstock comprises an anaerobic digester (12).

3. Apparatus according to claim 1 further characterized by:
   means for selectively maintaining (34) the hydrogen-rich reformate recycle gas pressure above inlet pressure of the feedstock pressurizing pump.

4. A method characterized by:
   drawing hydrocarbon feedstock gas (12, 13, 15) and a hydrogen-rich reformate recycle gas (11, 18, 19a, 45) through a feedstock pressurizing pump (14) to supply an inlet (20) of a hydrodesulfurizer (21);
   feeding (24) the hydrodesulfurizer exhaust to a secondary inlet (26) of an ejector (28), a primary inlet (29) of which is fed steam (36), an outlet (40) of which is fed to a fuel processor (40, 42-44) that generates said hydrogen-rich reformats recycle gas; and
   selectively maintaining (34) the hydrogen-rich reformate recycle gas pressure above inlet pressure of the feedstock pressurizing pump.

5. A method according to claim 4 further characterized by:
   feeding (11) said hydrogen-rich reformate gas to a fuel cell power plant (47), thereby extending the operating range of said fuel cell power plant on anaerobic digester gas.

6. A method according to claim 4 further characterized in that the hydrocarbon feedstock is anaerobic digester gas.

\* \* \* \* \*